Dec. 12, 1950 M. E. CUSHMAN 2,533,358
VARIABLE PITCH PROPELLER
Filed June 11, 1945 3 Sheets-Sheet 1

Inventor
Maurice E. Cushman
Attorney

Dec. 12, 1950  M. E. CUSHMAN  2,533,358
VARIABLE PITCH PROPELLER
Filed June 11, 1945  3 Sheets-Sheet 2

Inventor
Maurice E. Cushman
Attorney

Dec. 12, 1950   M. E. CUSHMAN   2,533,358
VARIABLE PITCH PROPELLER
Filed June 11, 1945   3 Sheets-Sheet 3

Inventor
Maurice F. Cushman
Attorney

Patented Dec. 12, 1950

2,533,358

UNITED STATES PATENT OFFICE 2,533,358

VARIABLE PITCH PROPELLER

Maurice E. Cushman, Verona, N. J., assignor to Curtiss-Wright Corporation, a corporation of Delaware Application June 11, 1945, Serial No. 598,792

8 Claims. (Cl. 170—160.11)

This invention relates to variable pitch propellers, and more particularly to a hub and blade shank construction in which the blade centrifugal force is employed to counteract or compensate the blade centrifugal twisting moment through a wide range of pitch adjustment.

In variable pitch propellers, the blade centrifugal twisting moment tends to cause the blade to rotate so as to bring the blade surface into the propeller plane of rotation and thus burdens the pitch-changing mechanism in resisting and overcoming such twisting moment. The wide range of pitch-change from feathering to reverse pitch requires that the blades be moved through an angle of 120 degrees and compensation of the twisting moment throughout this range is desirable. Where a cam arrangement is employed to derive from the blade centrifugal force a suitable compensating moment in opposition to the twisting moment, the wide angle through which the blade must turn places a limitation upon the number of such cams as may be employed and the centrifugal load is likely to unduly stress the parts.

The present invention seeks to covercome these difficulties by a differential opposed cam roller thrust bearing arrangement, the pitch of the cams being such as to produce a compensating moment in opposition to the blade centrifugal twisting moment, with the actual arcuate cam length in degrees being one-half of the total number of degrees through which the blade rotates. In such an arrangement, the rollers may be substantially doubled in number, with the thrust load per roller correspondingly reduced.

It is accordingly an object of the present invention to provide in a variable pitch propeller hub of the type described, a combined cam and thrust collar wherein a wide range of pitch-change is permitted with a multiplicity of thrust carrying rollers.

Another object of the invention is to provide in a variable pitch propeller hub, a combined thrust bearing and blade twist compensating means in which opposed cams and thrust rollers are employed.

A further object of the invention is to provide, in a variable pitch propeller hub, a combined thrust bearing and blade twist compensating means employing cams of an arcuate length of approximately one-half of the overall pitch-change angle.

Still another object of the invention is to provide in such a propeller hub having cams, "hour glass" shaped rollers with cooperating convex cams having low friction and self-aligning characteristics.

Yet another object of the invention is to provide, in a construction of the character set forth a positive mechanism for retaining the rollers in correct angular relation with respect to the cam surfaces.

The above and other novel features of the invention will appear more fully hereinafter from the following detailed description, when taken in conjunction with the accompanying drawings. It is expressly understood, however, that the drawings are for illustrative purposes only, and are not designed as a definition of the limits of the invention, reference being had for this purpose to the appended claims.

In the drawings wherein similar reference characters refer to like parts throughout the several views.

Figure 1:
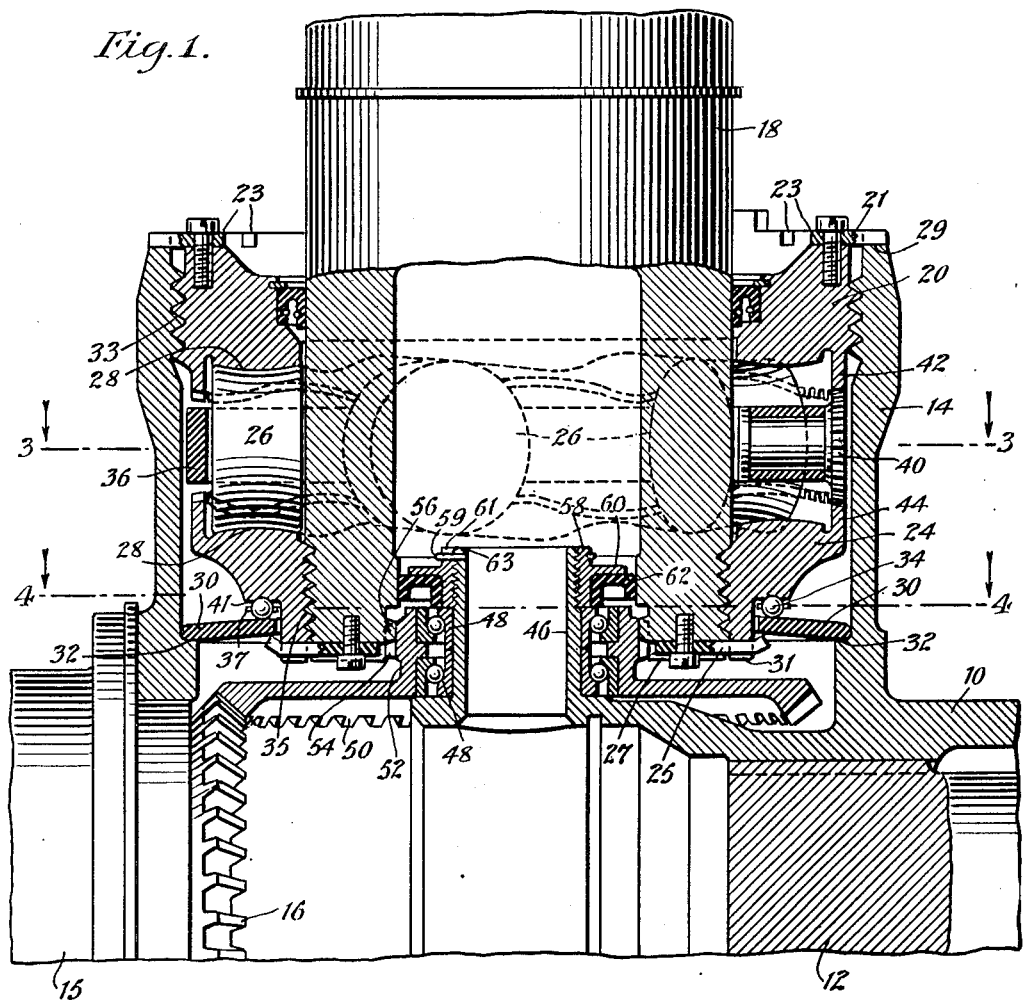
Figure 1 is a sectional view of a portion of a propeller hub taken on a plane passing through the hub axis and the axis of one of the blade sockets.

Referring to the drawings and more particularly to Fig. 1, there is illustrated a propeller hub 10 drivably connected to an engine crank or drive shaft 12. The hub is provided with two or more blade sockets as desired one of which, being illustrated, is generally indicated by the reference character 14. At the end of the hub opposite the drive shaft 12 is a housing 15 containing pitch-changing mechanism adapted to actuate a pitch-changing gear 16 arranged coaxial with the hub axis.

Within the socket 14 is positioned the shank 18 of a propeller blade, the socket and shank being provided with opposed shoulder rings 20 and 24 threaded into and upon the socket 14 and blade shank 18, respectively. The shoulder rings 20 and 24 are locked in proper position by a plurality of lug strips 21 and 25 secured to the ring 20 and shank 18 respectively in radial slots 23 and 27, the strips extending into radially aligned slots 29 and 31 in the end of the adjacent socket 14 and shoulder ring 24, respectively. The slots may be four in number and so spaced and arranged peripherally as to permit locking of the parts in one rotational position only, and the depth of the slots is less than the pitch of the threads 32 and 35 so that the parts cannot be locked except after threading the parts through the correct and predetermined number of turns. The opposed shoulders of the rings 20 and 24 are each divided into a number of segmental sections of equal arcuate length, each section of which is provided with a cam face adapted to coact through intervening rollers 26 with a cam face in the opposite ring to produce axial movement in response to relative rotation. Each of the cams in the sectors of each ring are identical with one another and through the rollers 26 carry the centrifugal thrust of the propeller blade during rotation of the propeller hub. The surface of the cams in a directional radially of the socket are convex as is indicated at 28 and the rollers 26 are concave or of hour-glass shape in order to provide a suitable roller thrust bearing between the shoulder rings 20 and 24 and to maintain the rollers in proper position radially with respect to the shank axis.

Figure 7:
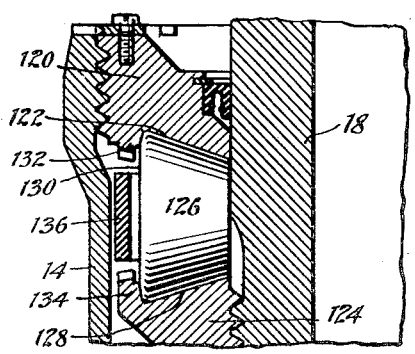
Fig. 7 is a fragmentary sectional view of a modification employing tapered rollers.

While hour-glass rollers described are the preferred form, if desired, conical rollers with corresponding conical faced cam faces may be employed as is shown in Fig. 7. In this modification, the socket 14 and blade shank 18 are provided with shoulder rings 120 and 124, respectively, having cam faces 122 and 128 engaging conical rollers 126. The cam rollers are held in circumferential place by a retainer ring 136, similar to ring 36, and radial thrust of the rollers is absorbed directly through the engagement of the outer face 130 of the rollers against the flanges 132 and 134 on the rings 120 and 124, the rings being sufficiently rigid for the purpose. The flanges and flange engaging portion of the outer face of the rollers are preferably spherical and of a radius extending to the center axis of the blade and socket, to provide a bearing area capable of absorbing the thrust load.

In order to preload the propeller blade within its socket, there is provided a dished annular resilient ring 30 bearing against a shoulder 32 in the hub socket, and against a thrust bearing 34, bearing against the underside of the shoulder ring 24 in a raceway 41. The resilient ring is adapted to yield upon relative axial movement between the blade and the socket in response to action of the rollers 26 upon the cams of the shoulder rings 20 and 24, and at the same time exert sufficient pressure so that the propeller blade is maintained in its proper position within the socket when the hub is not rotating. The thrust bearing 34 may have a split retaining ring 37, since the depth of the raceway in the shoulder 24 is sufficient so that the clearance between the overhanging ends 39 of the lugs 25 and the spring washer 30 confines the thrust bearing against displacement.

The rollers 26 are maintained in set relation circumferentially with respect to the blade shank and socket by the provision of an annular cage 36 having roller receiving recesses 38 therein. The cage by itself maintains the rollers in proper equal spacing and in addition is provided with one or more freely rotating toothed gears 40 pivoted in the ring about an axis radial with respect to the propeller shank. The gears 40 mesh with crown teeth arranged upon opposed annular cylindrical flanges 42 and 44 formed integrally with the shoulder rings 20 and 24, respectively. The crown teeth upon each of the flanges are arranged along a pitch line having a contour similar to that of the nearest adjacent roller cam so that as the shoulder rings 20 and 24 are forced apart by relative rotation and the resulting camming action, the crown teeth will continue to mesh with the gears 40. By this arrangement the roller cage 36 is caused to rotate through exactly one-half the angle of rotation of the propeller shank and shoulder ring 24. Thus, the cage maintains the rollers in proper position with respect to the cams at all times.

In order to transmit pitch-changing movement to the propeller shank there is provided upon the hub a core 46 at the base of each socket, the core being concentric with the socket axis. Journalled upon the core 46 by means of anti-friction bearings 48 is an indexing bevel gear 50 meshing with the pitch-changing bevel gear 16, the indexing gear having a sleeve 52 carrying splines 54 adapted to axially slidably engage mating splines 56 upon the internal bore of the root end of the propeller shank. The anti-friction bearings 48 are retained upon the core 46 by a threaded sleeve 58, the sleeve having a radial flange 60 adapted to retain in place an annular U-section washer 62 of rubber-like composition engaging the inner wall of the propeller shank and retaining lubricant from escaping outwardly into the hollow shank. The sleeve 58 is retained in place by a lock ring 59, having a radial portion extending into radial slots 61 and 63 of the sleeve and core, respectively.

Figure 2:
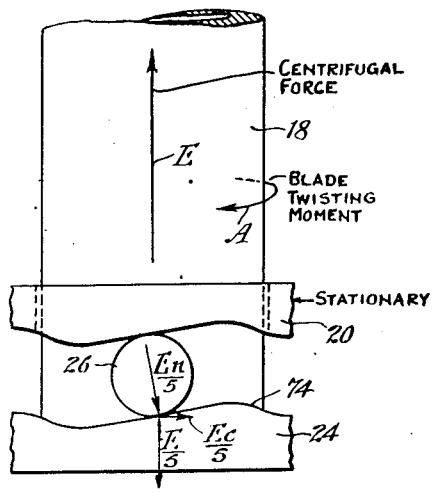
Fig. 2 is a diagrammatic showing of a blade and its socket and the cam compensating means employed.
Figure 3:
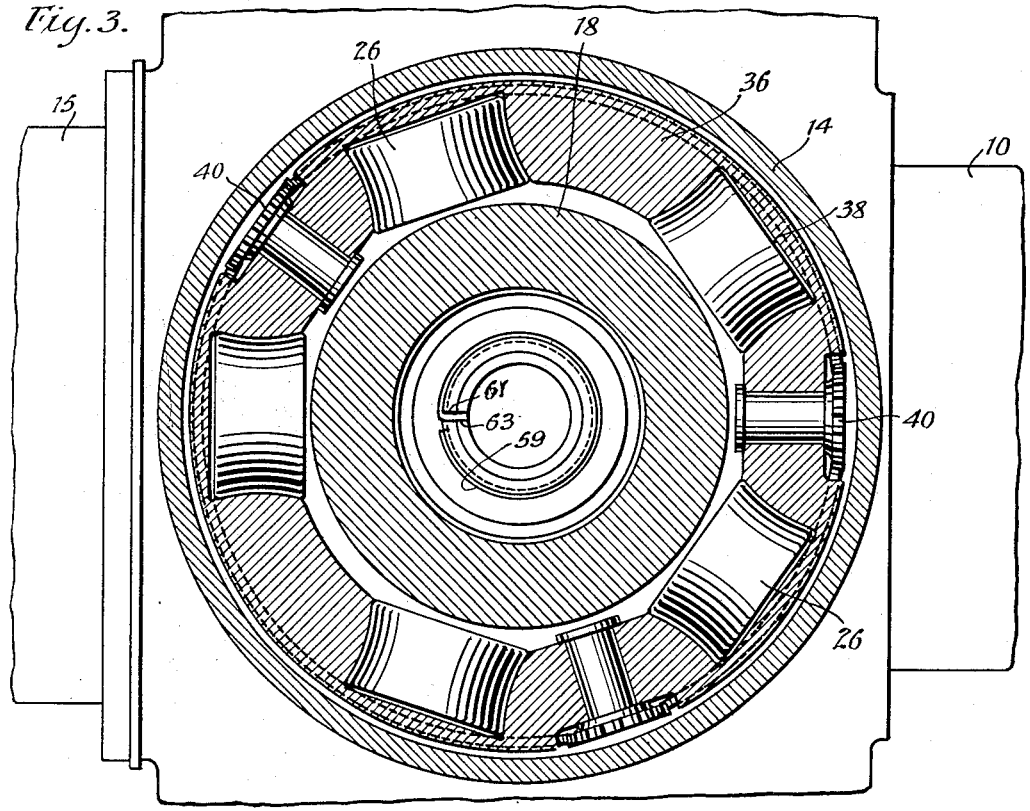
Fig. 3 is a section taken substantially on the line 3—3 of Fig. 1 showing the blade socket in transverse section on a plane passing through the cam roller axes.
Figure 4:
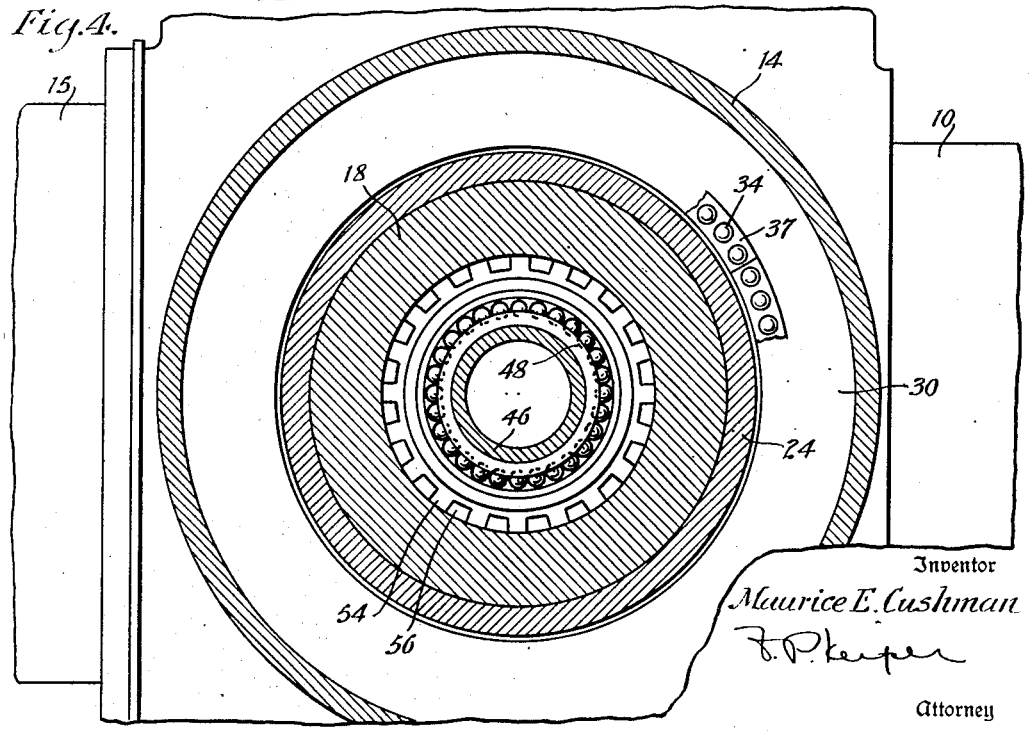
Fig. 4 is a section taken substantially on the line 4—4 of Fig. 1 illustrating in transverse section the blade root and the pitch-changing mechanism associated therewith.
Figure 5:
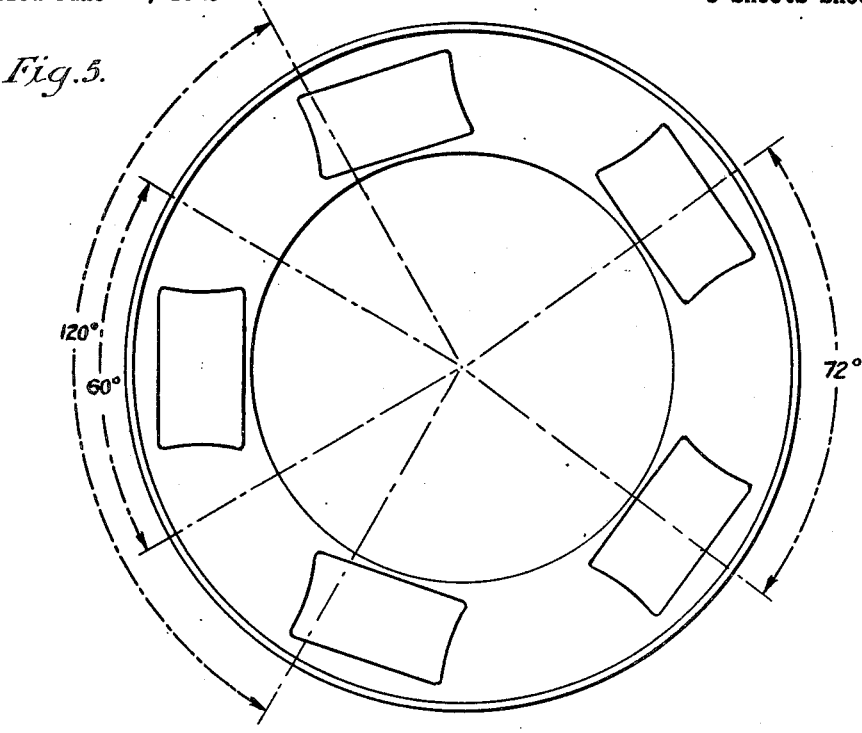
Fig. 5 is a diagrammatic view in plan of the rollers illustrating the angle of travel during the wide range of pitch change.
Figure 6:
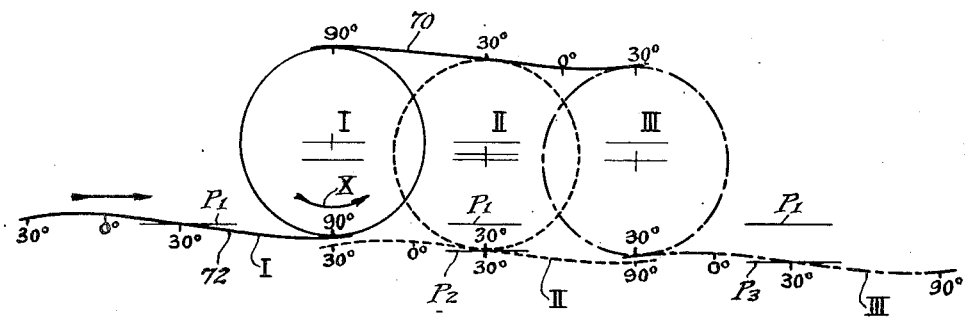
Fig. 6 is a diagrammatic illustration of a roller and its movement with respect to the opposed cam faces in engagement with the cam.

Reference to Figs. 2, 5 and 6 will assist in an understanding of the arrangement of the cams, and the axial movements imparted as a result of relative rotation of the parts. The blade centrifugal force acting in the direction of the arrow E is transmitted through the cam face 74 of the shoulder 24 through the roller 26 to the hub shoulder 20 and its cam face 76. Since five rollers are employed, the force E is distributed among the rollers equally and the force on each roller is $E/5$. Since the transmission of the force through the roller must be along a line normal to the surface of contact of the roller, the force $E/5$, produces a force $En/5$ normal to the point of roller contact. This force, acting on the shoulder 24 may be divided into two components, one represented by $E/5$ acting axially and the other $Ec/5$ acting circumferentially. The summation of the forces $Ec/5$ at each roller will then be $Ec$, and the pitch of the cam faces are preferably such as to produce a moment $EcR$, which shall be substantially equal and opposite to the centrifugal blade twisting moment indicated as acting in the direction of the arrow A. Thus the blade twist can be neutralized by a force derived from the centrifugal force. By neutralizing the blade twisting moment, the load upon the pitch-change mechanism can be reduced to the overcoming of friction of the parts.

It will, of course, be understood that the blade twisting moment will vary at different pitch angles. For such pitch positions where the blade twisting moment is great, the angle or pitch of the cam at the point to be engaged by the roller must be greater than at other points of roller contact for other pitch angles where the blade twist is less. The shape of the cams on the shoulders 20 and 24 can thus be designed to create a proper torque to oppose the blade twisting moment. For most satisfactory operation the cams should at any one position or instant present equal slopes at the respective points of contact. Typical opposed cam curves are shown in Fig. 6, but the contour will vary with variations in propeller design as will be understood by those skilled in the art.

Figs. 5 and 6 serve to illustrate the manner in which, through cams of sixty degree length, a blade rotation of 120 degrees may be had. The cam contour 70 of the socket being fixed or non-rotatable has been marked with degrees of propeller pitch, from 90 degrees through zero to —30 degrees of reverse pitch to indicate the points of roller contact for such blade pitch angles. The rollers 26 and their cage 36 move through a total angle of sixty degrees as indicated in Fig. 5. In doing so, the cam contour 72 of the shoulder 24 of the blade shank must move through one hundred and twenty degrees. The roller 26 in moving to the successive positions indicated at I, II, and III (see Fig. 6) rotates in the direction of the arrow X, and the cam contour 72 moves to corresponding positions I, II and III. The cam in moving from position I to position II is forced away from the opposite cam contour 70 as indicated by the distance between the transverse planes P1 and P2. The movement between the opposed cams in progressing from position II to position III is indicated by the planes P2 and P3. The movement is less because of the change in cam contour which is actually reversed in slope at the —30 degree end because of the reversal in pitch.

While the arcuate spacing of the rollers is shown in Fig. 5, as seventy-two degrees, and thus, five rollers employed, this figure provides for a twelve degree space between each pair of cams for return slope or recovery, which may be said to be diagrammatically shown in Fig. 2 at 74.

The invention thus far described has been treated in its application to an individual blade. It will appear that in a four-bladed propeller that the invention may be applied to only two opposite blades with the pitch of the cams doubled so as to create a torque from the blade centrifugal force double that of the individual blade twisting moment. Through the interconnection of all four blades through the common pitch-changing drive gear 78 and the indexing gears 76 on each blade, the blade twisting moment of all four blades can be compensated for by the centrifugal torque developed in but two of the blades. With such an arrangement, a standard swivel blade socket construction may be employed for all blades where four or any greater even number of blades are employed except for two opposing blades, to which a construction as herein disclosed would be applied. In instances where balance is of small importance and will not be seriously disturbed by a single blade moving axially toward and away from the hub, the invention could be applied to one blade of a two or more bladed propeller, the compensation provided for the one blade being increased in proportion to the number of blades and transmitted to the other uncompensated blades.

Although rollers of hour-glass configuration have been shown cooperating with complementally cross-sectioned cam surfaces, and by such arrangement the parts are self-centered and self-aligning to maintain each roller axis radial, any other type of roller such as tapered rollers are illustrated or transversely laminated rollers with corresponding cam surfaces may be employed if desired, but the friction characteristics may be increased thereby. The length of the cams may further be decreased by employing two sets of rolls and two sets of opposed cams, with an intermediate floating shoulder between the two sets carrying a part of the cams for each set.

Though a single embodiment of the invention has been illustrated and described, it is to be understood that the invention is not limited thereto. Various changes in the arrangement of parts and in the details of construction as well known by those skilled in the art may be made without departing from the spirit of the invention. Reference will therefore be had to the appended claims for a definition of the limits of the invention.

What is claimed, is:

1. In combination, a propeller hub having a socket for receiving the shank of a variable pitch propeller blade, a blade shank positioned in said socket, blade retention means comprising a roller thrust bearing including opposed roller raceways having multiple segmental circumferentially inclined cam surfaces of equal length and a roller for each pair of such opposed cam surfaces, said cam surfaces being inclined and so disposed and arranged as to compensate for the blade centrifugal twisting moment, means for retaining said rollers in proper angular relation to said opposed raceways and segmental cam surfaces thereof, a boss in the base of said socket rigid with the socket, pitch-changing means journalled on said boss and having axially sliding splined engagement with internal splines in said shank, and means for sealing the annular space between the tip of said boss and the inside wall of said shank.

2. In combination, a propeller hub having a socket for receiving the shank of a variable pitch propeller blade, a blade shank positioned in said socket, blade retention means comprising a roller thrust bearing including opposed roller raceways having multiple segmental circumferentially inclined cam surfaces of equal length, and a roller for each pair of such cam surfaces, said cam surfaces being inclined and so disposed and arranged as to compensate for the blade centrifugal twisting moment, means for retaining said rollers in proper angular relation with respect to said cams, and for causing said rollers to move through an angle one-half of the combined movement of said raceways, a boss in the base of said socket rigid with the socket, pitch-changing means journalled on said boss and having axially sliding splined engagement with internal splines in said shank, and means for sealing the annular space between the tip of said boss and the inside wall of said shank.

3. In combination, a propeller hub having a controllable pitch propeller blade socket, a retaining ring secured in the end of said socket having an end face divided into a plurality of like undulating cam face segments, a blade shank arranged in said socket and having a flange having an end face divided into a like number of uniform cam segments as provided on said ring, a single roller for each of said segments adapted to engage a ring segment and a flange segment, roller retaining means for maintaining said rollers in spaced relation, a pinion carried by said roller retaining means rotatable on an axis transverse to the blade axis, and crown teeth depending from said ring, and projecting from said flange meshing with said pinion from opposite sides, said crown teeth being cut on a line having parallel relation to an adjacent segment cam face.

4. In combination, a propeller hub having a controllable pitch propeller blade socket, a retaining ring mounted in the end of said socket having an end face divided into a plurality of like undulating cam face segments, a blade shank arranged in said socket and having a flange mounted thereupon and having an end face divided into a like number of uniform undulating cam segments as provided on said ring, a single roller for each of said segments adapted to engage a ring segment and a flange segment, roller retaining means for maintaining said rollers in spaced relation, a pinion carried by said roller retaining means rotatable on an axis transverse to the blade axis and independent of said rollers, and opposed sets of crown teeth carried by said ring and said flange, meshing with said pinion from opposite sides, and compensating means for said crown teeth causing said teeth to maintain meshing engagement with said pinion during relative axial movements between said ring and shoulder.

5. In combination, a propeller hub having a blade socket for receiving the shank of a variable pitch propeller blade, a hollow blade shank positioned in said socket, an annular member mounted in said socket at the outer end having a series of identical segmental cam faces facing axially of the blade and toward the hub axis, an annular member mounted upon the inner end of the shank of said blade and having a number of segmental cam faces opposed to said first named cam faces and equal in number, said cam faces undulating and having radial convex faces, rollers interposed between each pair of said opposed cam faces having concave axial profile or hour-glass shape, and means for retaining the angular relation between said rollers and said annular members for all points of blade pitch adjustment, said means including coaxial crown gears fixed to respective annular members engaging pinions drivably connected to said rollers, the pinion axes being substantially radial relative to the blade axis, whereby said rollers move angularly about the blade axis one-half of the angular movement of said annular members relative to each other.

6. In combination, a propeller hub having a controllable pitch propeller blade socket, a retaining ring secured in the end of said socket having an end face divided into a plurality of like undulating cam face segments approximately sixty arcuate degrees in length, a blade shank rotatably arranged in said socket for movement through an angle of approximately one hundred and twenty degrees and having a flange having an end face divided into a like number of uniform undulating cam segments as provided on said ring, a single roller for each of said segments adapted to engage a ring segment and a flange segment, roller retaining means for maintaining said rollers in spaced relation, a pinion carried by said roller retaining means rotatable on an axis transverse to the blade axis, and crown teeth depending from said ring and projecting from said flange meshing with said pinion from opposite sides, said crown teeth being cut on a line having parallel relation to an adjacent segment cam face.

7. In combination, a propeller hub having a controllable pitch propeller blade socket, a retaining ring secured in the end of said socket having an end face divided into a plurality of similar undulating cam face segments, a blade shank arranged in said socket and having a flange portion with an end face divided into a like number of uniform cam segments as provided on said ring and facing said ring, a single roller for each opposed pair of said segments adapted to engage a ring segment and a flange segment, roller control means for maintaining said rollers in spaced relation comprising a pinion rotatable on an axis substantially transverse to the blade axis and drivably connected to at least one roller, and crown gear teeth depending from said ring and projecting from said flange meshing with said pinion on opposite sides thereof, said crown teeth being cut on a line having parallel relation to an adjacent segment cam face.

8. In combination, a propeller hub having a controllable pitch propeller blade socket, a retaining ring secured in the end of said socket having an end face divided into a plurality of similar undulating cam face segments approximately 60 arcuate degrees in length, a blade shank rotatably arranged in said socket for movement through an angle of approximately 120 degrees and having a flange with an end face facing said ring and divided into a like number of uniform undulating cam segments as provided on said ring, a roller for each opposing pair of segments engaging a ring segment and a flange segment, roller control means for holding said rollers in spaced and timed relation including a pinion rotatable on an axis transverse to the blade axis and drivably related to said roller, and crown teeth projecting from said ring and from said flange meshing with said pinion on opposite sides thereof, said crown teeth being formed to provide a pinion engagement path conforming to the undulations of said cam faces.

MAURICE E. CUSHMAN.

REFERENCES CITED

The following references are of record in the file of this patent:

UNITED STATES PATENTS

| Number | Name | Date |
|---|---|---|
| 141,129 | Eccles | July 22, 1873 |
| 715,171 | Stilson | Dec. 2, 1902 |
| 1,161,970 | Pullian | Nov. 30, 1915 |
| 1,376,309 | Armstrong | Apr. 26, 1921 |
| 1,646,947 | Armstrong | Oct. 25, 1927 |
| 1,829,443 | Gobereau | Oct. 27, 1931 |
| 1,887,543 | Chilton | Nov. 15, 1932 |
| 1,920,674 | Barbarou | Aug. 1, 1933 |
| 1,951,320 | Blanchard | Mar. 13, 1934 |
| 1,973,573 | Lougheed | Sept. 11, 1934 |
| 2,020,239 | Coats | Nov. 5, 1935 |
| 2,037,251 | Mansson | Apr. 14, 1936 |
| 2,094,149 | Gaba | Sept. 28, 1937 |
| 2,138,339 | Chauviere | Nov. 29, 1938 |
| 2,205,835 | Landrum | June 25, 1940 |
| 2,233,364 | Gemeny | Feb. 25, 1941 |
| 2,291,953 | Dicks | Aug. 4, 1942 |
| 2,460,559 | Wildhaber | Feb. 1, 1949 |

FOREIGN PATENTS

| Number | Country | Date |
|---|---|---|
| 95,613 | Sweden | Mar. 2, 1939 |
| 336,479 | Great Britain | Oct. 16, 1930 |
| 353,513 | Italy | Oct. 19, 1937 |
| 469,774 | Great Britain | Aug. 3, 1937 |
| 486,614 | Great Britain | June 8, 1938 |